US011062601B2

(12) United States Patent
Ayoub (10) Patent No.: US 11,062,601 B2
(45) Date of Patent: Jul. 13, 2021

(54) SYSTEMS AND METHODS OF VEHICLE DETECTION WITHIN A VEHICLE PARKING FACILITY

(71) Applicant: BlackBerry Limited, Waterloo (CA)

(72) Inventor: Sameh Ayoub, Ottawa (CA)

(73) Assignee: BlackBerry Limited, Waterloo (CA)

( * ) Notice: Subject to any disclaimer, the term of this patent is extended or adjusted under 35 U.S.C. 154(b) by 17 days.

(21) Appl. No.: 16/198,932

(22) Filed: Nov. 23, 2018

(65) Prior Publication Data

US 2020/0168090 A1    May 28, 2020

(51) Int. Cl.
*G08G 1/14* (2006.01)
*B64C 39/02* (2006.01)
*G06K 9/00* (2006.01)

(52) U.S. Cl.
CPC .......... *G08G 1/142* (2013.01); *B64C 39/024* (2013.01); *G06K 9/00664* (2013.01); *B64C 2201/123* (2013.01)

(58) Field of Classification Search
CPC   G08G 1/142; B64C 39/024; B64C 2201/123; G06K 9/00664
USPC ........................................................ 348/144
See application file for complete search history.

(56) References Cited

U.S. PATENT DOCUMENTS

| 9,418,553 | B2 | 8/2016 | Nakhjavani |
| 9,594,956 | B2 | 3/2017 | Cohen et al. |
| 10,311,731 | B1* | 6/2019 | Li .......................... G08G 1/142 |
| 2012/0299749 | A1 | 11/2012 | Xiao et al. |
| 2015/0086071 | A1 | 3/2015 | Wu et al. |
| 2015/0339924 | A1 | 11/2015 | Cook et al. |
| 2016/0078759 | A1 | 3/2016 | Nerayoff et al. |
| 2017/0011631 | A1* | 1/2017 | Nordbruch ......... B62D 15/0285 |
| 2017/0294121 | A1* | 10/2017 | Jain ......................... G01S 13/91 |
| 2018/0114437 | A1* | 4/2018 | Singh ................... H05B 47/125 |
| 2018/0174453 | A1* | 6/2018 | Hohenacker .......... G08G 1/144 |
| 2018/0268617 | A1* | 9/2018 | Bruce .................... G07B 15/02 |

FOREIGN PATENT DOCUMENTS

DE    102015008422    10/2016

* cited by examiner

*Primary Examiner* — Jae N Noh
(74) *Attorney, Agent, or Firm* — Rowand LLP (57) ABSTRACT

Systems and methods for vehicle detection within a vehicle parking facility. The system includes one or more vehicle detection sensors positioned about the vehicle parking facility. The system includes processor executable instructions for determining a measure of available parking spaces based on sensor data from one or more vehicle detection sensors. The system receives, from an image capture device, image data representing an occupancy state of discrete parking spaces. The system determines, based on the image data, that a subject vehicle occupying a target parking space additionally occupies an area external to the target parking space and, in response, determines a number of unusable parking spaces. The system generates and transmits, to a display, parking space inventory data based on the determined number of unusable parking spaces and the measure of available parking spaces.

20 Claims, 5 Drawing Sheets

SYSTEMS AND METHODS OF VEHICLE DETECTION WITHIN A VEHICLE PARKING FACILITY

FIELD

The present application generally relates to vehicle detection and, in particular, to systems and methods of vehicle detection within a vehicle parking facility.

BACKGROUND

High-volume vehicle parking facilities typically extend across large parcels of land or include multi-level stacked structures having sub-divisions of parking spaces therein. When a vehicle parking facility is busy, vehicle operators often circle the parking facility in search for an available parking space and typically resort to guess work for finding an available parking space. The challenges are further magnified when the vehicle operator operates a large vehicle, such as a truck with long length. Parking facility laneways can be narrow or littered with other vehicles also in search of an available parking space.

Some vehicle parking facilities employ systems for identifying the number of vehicles within the parking facilities. These systems include, for example, vehicle detection sensors at the parking facility entrance(s) or exit(s) for determining a net number of vehicles that may be within the vehicle parking facilities. Some other systems include, for example, an overhead vehicle detection sensor associated with each respective parking space for determining whether a allocated parking space may be occupied. Based on a blueprint of vehicle parking spaces and on the data from the various vehicle detection sensors, the example systems can provide theoretical estimates of the number of available parking spaces within the parking facilities.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

In a first aspect, the present application describes a system for vehicle detection within a vehicle parking facility. The system includes one or more vehicle detection sensors positioned about the vehicle parking facility. The system includes a server including a communication module, a processor coupled to the communication module, and a memory coupled to the processor. The memory stores processor-executable instructions that, when executed, cause the processor to: determine a measure of available parking spaces based on sensor data received from the one or more vehicle detection sensors; receive, via the communication module from an image capture device, image data representing an occupancy state of discrete parking spaces within the vehicle parking facility; determine, based on the image data representing the occupancy state, that a subject vehicle occupying a target parking space additionally occupies an area external to the target parking space and, in response, determine a number of unusable parking spaces; and generate and transmit, to a display, parking space inventory data based on the determined number of unusable parking spaces and the measure of available parking spaces.

In another aspect, the present application describes a method of operating a system for vehicle detection within a vehicle parking facility. The system includes one or more vehicle detection sensors positioned at the vehicle parking facility. The method includes: determining a measure of available parking spaces based on sensor data received from the one or more vehicle detection sensors; receiving, via a communication module from an image capture device, image data representing an occupancy state of discrete parking spaces within the vehicle parking facility; determining, based on the image data representing the occupancy state, that a subject vehicle occupying a target parking space additionally occupies an area external to the target parking space and, in response, determining a number of unusable parking spaces; and generating and transmitting, to a display, parking space inventory data based on the measure of available parking spaces and the determined number of unusable parking spaces.

In yet a further aspect, the present application describes non-transitory computer-readable storage medium storing processor-readable instructions that, when executed, configure a processor to perform one or more of the methods described herein. In this respect, the term processor is intended to include all types of processing circuits or chips capable of executing program instructions.

Other aspects and features of the present application will be understood by those of ordinary skill in the art from a review of the following description of examples in conjunction with the accompanying figures.

In the present application, the terms "about", "approximately", and "substantially" are meant to cover variations that may exist in the upper and lower limits of the ranges of values, such as variations in properties, parameters, and dimensions. In a non-limiting example, the terms "about", "approximately", and "substantially" may mean plus or minus 10 percent or less.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Vehicle parking facilities can utilize large parcels of land or multi-level structures for providing vehicle parking spaces. Parking spaces can vary in size, such as parking spaces sized for motorcycles, parking spaces sized for passenger vehicles, parking spaces sized for large sportutility or pick-up truck type vehicles, or parking spaces sized for buses/recreational vehicles (RVs)/tractor trailers. Vehicle parking facilities are typically designed to maximize the number of vehicles that may be accommodated therein. To do so, in some examples, parking facility plans may designate different areas for motorcycle parking, for bus/RV/truck parking, for passenger vehicle parking, etc. Further, vehicle laneways may be narrow to maximize allocation of land for vehicle parking spaces.

When a vehicle parking facility is busy, vehicle operators often circle the parking facility in search of an available parking space, often resorting to guess work when deciding where to navigate or which sections of the parking facility to search. Some vehicle parking facilities employ systems that include one or more vehicle detection sensors for estimating the vacancy rate of the parking facility. For example, data received from vehicle detection sensors at entrance(s) and exit(s) can be used for estimating the number of vehicles currently within the vehicle parking facility. In other examples, data received from respective overhead vehicle detection sensors associated with each respective parking space may be used for deducing whether an allocated parking space is currently occupied. Using a blueprint of the parking facility and data received from vehicle detection sensors, such example systems can provide a theoretical estimate of the number of currently available parking spaces within the parking facilities. These theoretical estimates may be displayed on a display device at the parking facility entrance or at various laneways dividing sub-sections of the parking facility to provide vehicle operators with information for increasing their chances of finding an available parking space.

Systems that utilize vehicle detection sensors at the parking facility entrance(s) and exit(s) for estimating the net number of vehicles within the parking facility and deducing a theoretical number of remaining parking spaces may not differentiate the number of vehicles that are already parked and the number of vehicles that may be circling for parking spaces. Further, these systems may fail to account for vehicles that may be occupying more than one parking space and may fail to account for parking spaces that may be obstructed by non-vehicle objects or laneway obstructions that may lead to the potentially available parking spaces. For example, laneway obstructions can include vehicles not parked within a designated parking space, thereby impeding access to several other available parking spaces. In other examples, laneway obstructions can include vehicles obstructing an entranceway or exit way of a parking facility or subsections (e.g., parking level or other subdivision) of a parking facility. Accordingly, solely relying upon vehicle detection counters at entrance(s) and exit(s) may result in overestimating the number of available parking spaces and result in misleading information regarding parking space vacancy rates. Further, in some examples, parking spaces may be designated for particularly sized vehicles (e.g., passenger vehicle parking space has a different size than a transport truck/tractor trailer parking space). The above described systems may fail to account for vehicles parking in inappropriately sized parking spaces, such as a passenger vehicle occupying a space designated for a 53 foot tractor trailer truck or a large transport truck occupying multiple spaces designated for passenger vehicles.

Systems that utilize vehicle detection sensors associated with each respective parking space, such as overhead vehicle detection sensors, can fail to detect non-vehicle objects. For example, overhead vehicle detection sensors may be unable to detect a low-lying snow pile placed thereon by a parking facility snowplow. Further, overhead vehicle sensors can have a limited detection field. The detection field may correspond to central areas of a discrete parking space and can fail to detect a vehicle in an adjacent parking space that may be partially over a parking space boundary, thereby effectively causing one of the parking spaces to be unusable by another vehicle. In some other examples, metal detection sensors installed beneath parking space surfaces can fail to detect non-vehicle objects that are not metal or that may not be within the field of detection of the metal detection sensors.

In some examples, image or video cameras positioned atop light posts or at fixed locations throughout the parking facility may be used for identifying whether parking spaces are occupied or available. However, inaccuracies from, for example, a parallax effect (e.g., difference in apparent displacement of an object viewed along different lines of sight) of fixed position cameras can cause inaccuracies in determining whether a known parking space is occupied or available. For example, an image capture device positioned at a corner of a parking facility may be unable to capture images for identifying a parking space that may be partially occupied by a vehicle in an adjacent space, and partially occupied to the point of being unusable.

Accordingly, the present application proposes systems and method to detect vehicles within a vehicle parking facility and to refine vehicle vacancy rate data based on vehicle detection systems and methods. Example systems can determine a measure of available parking spaces based on sensor data received from one or more vehicle detection sensors located about the parking facility. The systems can then receive image data representing an occupancy state of discrete parking spaces within the vehicle parking facility and determine whether a subject vehicle that is occupying a target parking space additionally occupies an area external to that target parking space. In some examples, the image data can be captured using aerial image capture devices that are navigated to a plurality of positions throughout the parking facility. In response to determining that the subject vehicle occupies an area external to the target parking space (e.g., incorrectly parked), the system can determine a number of unusable parking spaces due to the incorrectly parked subject vehicle. Systems can then update parking space inventory data to account for incorrectly parked vehicles or to account for other non-vehicle obstructions occupying otherwise available parking spaces.

Figure 1:
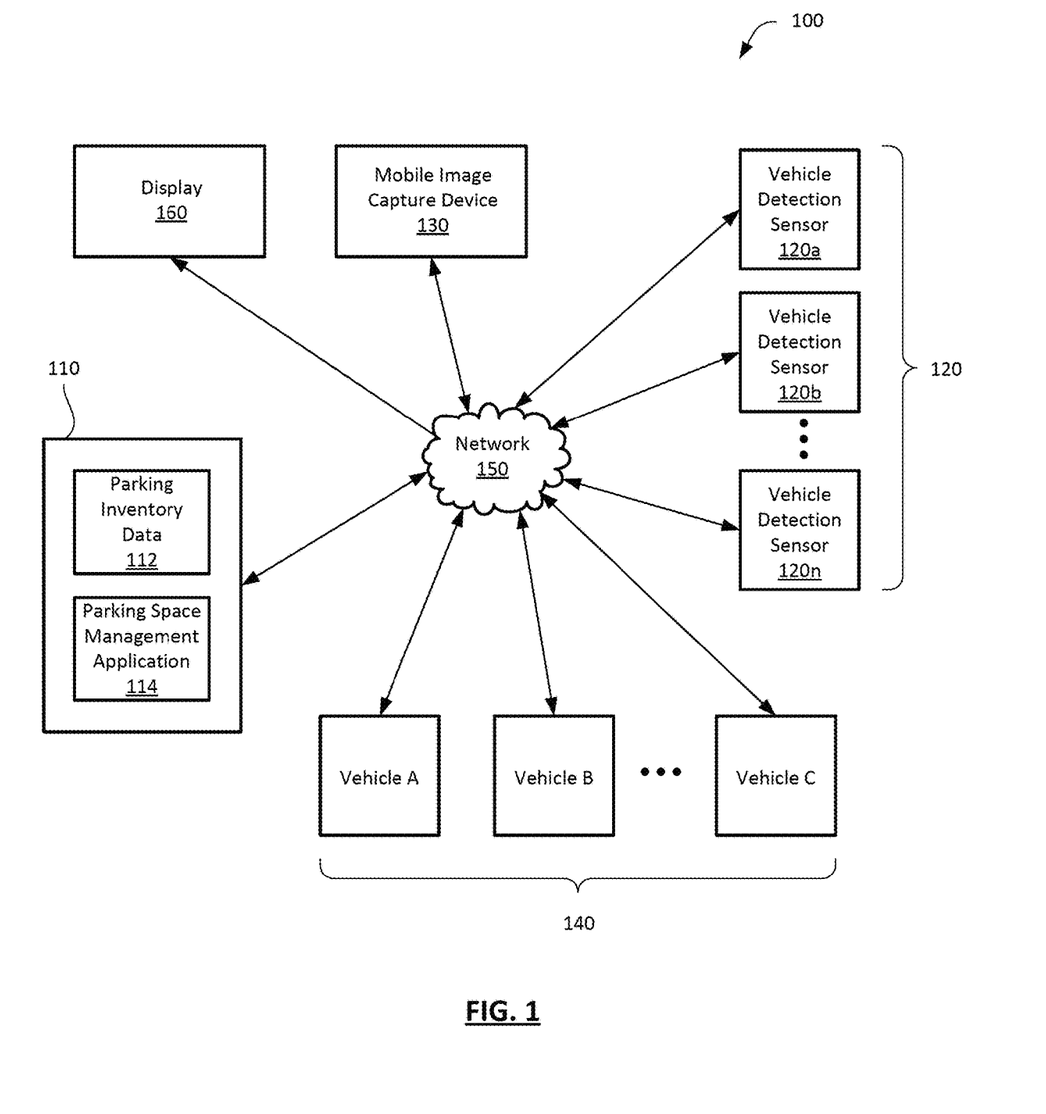
FIG. 1 diagrammatically illustrates a system of detecting vehicles within a vehicle parking facility.

Reference is made to FIG. 1, which diagrammatically illustrates a system 100 for vehicle detection within a vehicle parking facility. The system 100 can include vehicle detection sensors 120 in communication with a remote server 110. The system 100 also includes a mobile image capture device 130 in wireless communication with the remote server 110. In some examples, the mobile image capture device 130 may be an unmanned aerial vehicle (UAV) or a drone-type device for travelling through the parking facility and capturing one or more images at one or more locations. In some examples, the system 100 can detect a plurality of vehicles 140, where the respective vehicles 140 can, via a network 150, be in wireless communication with the remote server 110. In some other examples, a communication device associated with the respective vehicles 140 may be in communication with the remote server 110, such that the remote server 110 may transmit and receive messages to a communication module of the respective vehicles 140 or to a communication device associated with the respective vehicles 140. Further, the system 100 can include a display 160 positioned at the entrance(s)/exit(s) of the parking facility or within laneways of the parking facility for displaying, among other details, vacancy rates of subsections of the parking facility. For example, the display 160 can receive vacancy rate data from the remote server 110 or any other device within the system 110 and can display, among other information, details corresponding to vacancy rates of the parking facility. In some examples, the display 160 can indicate a number of available parking spaces for a particular parking space type. For instance, the display 160 can indicate that there are 100 passenger vehicle spaces, 20 mid-size truck parking spaces, and 10 long truck parking spaces in addition to or in place of indicating that there are 130 parking spaces. In some examples, details such as vacancy rates of the parking facility can also be transmitted to other communication devices, such as parking facility operator devices, in-vehicle communication systems, or mobile communication devices associated with vehicle operators, for display on said respective devices.

The vehicle detection sensors 120, the mobile image capture device 130, the plurality of vehicles 140, and the remote server 110 may be connected via the network 150. The network 150 can include a plurality of interconnected wired and/or wireless networks, including the Internet, wireless local area networks, wide area networks, cellular networks, or the like and configured for data communication with other computing devices that are connected to the network 150.

Vehicle detection sensors 120 can be provided in various forms, such as infrared proximity sensors, motion sensors, light sensors, or the like. The vehicle detection sensors 120 can include a first vehicle detection sensor 120a. In some examples, the system can additionally include any number of vehicle detection sensors, such as a second vehicle detection sensor 120b, . . . an n$^{th}$ vehicle detection sensor 120n. The vehicle detection sensors 120 can be proximity sensors positioned at an entranceway or an exit of a parking facility for detecting the number of vehicles entering the parking facility and for detecting the number of vehicles exiting the parking facility. Vehicle detector sensors 120 at entranceways/exits for deducing the number of available parking spaces can provide data for determining a theoretical measure of vacancy rates, but can fail to take into consideration inappropriately parked vehicles that take up two or more parking spaces or can fail to take into account parking spaces obstructed by non-vehicle objects.

In some other examples, the vehicle detection sensors 120 can be overhead sensors positioned atop respective parking spaces (or at any other position relative to a respective parking space). For example, the vehicle detection sensors 120 can be infrared sensors that may be centrally located within the boundaries of a parking space for detecting when a vehicle has properly occupied a parking space and for transmitting sensor data to a remote server for identifying that the corresponding parking space is occupied/unavailable. A vehicle that properly occupies a parking space is typically positioned within the boundaries of that parking space. When the parking space is not occupied by a vehicle, the vehicle detection sensor can transmit sensor data to the remote server for identifying that the corresponding parking space is available. In the scenario when a vehicle is not fully parked within the boundaries of that parking space, the vehicle may erroneously straddle an adjacent parking space. The adjacent parking space may be unusable by another vehicle (e.g., too narrow a space). As described above, in some examples, the overhead vehicle detection sensors 120 may be centrally located within the boundary of the parking space and may not detect that the above described vehicle is straddling the adjacent parking space. As the adjacent parking space may not be recognized as unusable or occupied, solely relying on the example overhead vehicle detection sensors for the respective parking spaces can result in overestimating the parking facility vacancy rate.

The system 100 can include image or video capture devices positioned at fixed locations within the vehicle parking facility. However, image recognition or processing operations on images captured using fixed position image/video capture devices can be affected by the parallax effect, thereby causing inaccuracies in determining whether a known parking space is occupied or available.

To address some of the deficiencies of solely utilizing vehicle detection sensors 120, the system 100 includes a mobile image capture device 130. The mobile image capture device 130 can be an unmanned aerial vehicle (UAV) (e.g., aerial drone-like device) having an image capture capabilities. As will be described, in some examples, the remote server 110 can transmit signals to the mobile image capture device 130 having instructions for navigating the mobile image capture device 130 to positions within the parking facility for generating image data representing the occupancy state of the parking facility. In some other examples, the remote server 110 can transmit signals to the mobile image capture device 130 having instructions for capturing image data representing vehicle identifier information of vehicles misusing vehicle parking spaces. In some examples, the mobile image capture device 130 can be other image capture devices that can travel within a vehicle parking facility for detecting vehicles.

The remote server 110 can include one or more computing devices and can include one or more processors, memory, and processor-executable instructions that, when executed, cause the one or more processors to carry out one or more of the operations described herein. The processor-executable instructions may be in the form of modules, applications, or other computer programs, and may be standalone programs or incorporated into larger programs relating to vehicles.

As an example, the remote server 110 can include parking inventory data 112 and a parking space management application 114. The parking inventory data 112 can include a reference plan or blueprint of a vehicle parking facility for identifying vehicle parking space allocations. For example, each respective parking space may be associated with boundaries demarking the area allocated to that parking space. Further, the parking inventory data 112 can include real-time or near real-time snapshots of the vacancy rate based on data received from the devices of the system 100 and based on operations described herein.

The parking space management application 114 can determine a measure of available discrete parking spaces based on sensor data received from the vehicle detection sensors 120 and based on operations on image data received from the mobile image capture device 130. For instance, the parking space management application 114 can receive image data representing an occupancy state of discrete parking spaces from the mobile image capture device 130 and, in response, determine that a subject vehicle occupying a target parking space additionally occupies an area external to the target parking space. Thus, the parking space management application 114 can determine that the subject vehicle is occupying two or more parking spaces and determine that one of the parking spaces is unusable by other vehicles. As described above, because sensor data based on vehicle detection sensors 120 mounted at entrance(s)/exit(s) of the parking facility or mounted overhead parking spaces can provide data that results in overestimating the number of available parking spaces, identification of unusable parking spaces can be used for correcting or refining parking inventory data.

Figure 2:
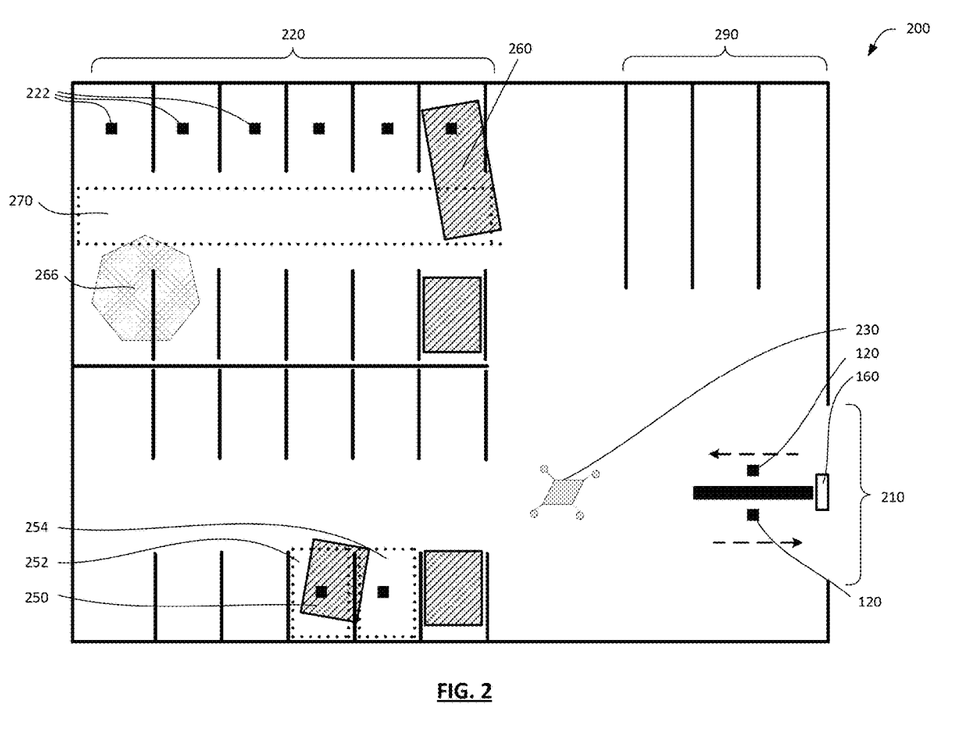
FIG. 2 diagrammatically illustrates top view of a parking facility, in accordance with an example of the present application.

Reference is now made to FIG. 2, which diagrammatically illustrates a top view of a parking facility 200, in accordance with an example of the present application. The parking facility 200 can include a system 100 (FIG. 1) for managing vehicle detection within the parking facility 200. For ease of exposition, the illustrated parking facility 200 is a simplified example and partially illustrates components of the system 100. For example, the system 100 may include overhead vehicle detection sensors for each respective parking space, but for ease of exposition in FIG. 2, the overhead vehicle detection sensors are only illustrated for a select number of parking spaces. It can be appreciated that the system 100 can be implemented for parking facilities of a larger size, having multiple levels, or being configured in any other configuration for allocating parking spaces for a variety of vehicle types. For example, a row 220 of parking spaces illustrated in FIG. 2 may be allocated for passenger vehicles, whereas another row 290 of parking spaces illustrated in FIG. 2 may be allocated for cargo transport vehicles (e.g., 53 foot length tractor trailers) or buses. It can be appreciated that the parking facility 200 can include multiple types of vehicle parking spaces respectively allocated for differently sized vehicles.

As illustrated in FIG. 2, the parking facility 200 can include vehicle detection sensors 120 (FIG. 1) at an entrance/exit passageway 210 of the vehicle parking facility 200. The vehicle detection sensors 120 at the entrance/exit passageway can count the number of vehicles entering the parking facility 200, can count the number of vehicles exiting the parking facility 200, and subsequently deduce a theoretical vehicle occupancy rate based on a reference parking facility plan of parking spaces. The vehicle occupancy rate can be displayed, for example, on a display 160 positioned proximal to the entrance/exit passageway 210. Relying on vehicle count at the entrance/exit passageway 210 assumes that each parking space within the parking facility 200 is available and can be used. However, when a snow plow, for example, places a pile of snow or other non-vehicle obstruction 266 within the boundaries of one or more parking spaces, those parking spaces become unavailable but may not be accounted for by the remote system 110 when determining vacancy rate.

As described, system 100 can also include vehicle detection sensors associated with respective parking spaces. For example, each parking space in a row 220 of parking spaces may include an overhead detection sensor 222 mounted atop the respective parking spaces. The respective overhead detection sensors 222 can have a field of detection located centrally within the respective parking spaces and can detect vehicle presence when a vehicle is positioned within the boundaries of the parking space. However, when a vehicle or a portion of a vehicle is positioned outside the field of detection of the respective overhead detection sensors 222, the overhead detection sensors 222 can fail to identify an obstruction that may cause that respective parking space to be unavailable or unusable by a vehicle.

For example, in FIG. 2, a subject vehicle 250 may be parked within a target parking space 252. The overhead detection sensor for the target parking space 252 may detect presence of the subject vehicle 250 and transmit sensor data to this effect to the remote server 110. However, due to inadvertence or vehicle operator error, the subject vehicle 250 may also be occupying a portion of an adjacent parking space 254 in such a way that the adjacent parking space 254 may not be able to accommodate within boundaries (e.g., illustrated in FIG. 2 using dotted lines) of the adjacent parking space 254 another passenger vehicle. As illustrated in FIG. 2, because the subject vehicle 250 may not be occupying space within a field of detection of the overhead detection sensor in the adjacent parking space 254, the remote server 110 can fail to determine a vacancy rate based on the unavailability of the adjacent parking space 254.

In a further scenario, the vehicle detection sensors illustrated in FIG. 2 may fail to detect unavailability of parking spaces due in part to obstructed laneways. For example, in FIG. 2, several parking spaces may be accessible by a laneway 270. However, when a large vehicle 260, such as a bus or an extended length truck, erroneously occupies a parking space that is allocated or sized for a passenger vehicle, the large vehicle 260 may inadvertently block the laneway 270, thereby becoming an obstruction and causing several parking spaces to be inaccessible. It can be appreciated that the remote server 110 may be unable to determine, based on the overhead detection sensors 222 or the vehicle detection sensors 120 at the entrance/exit passageway 210, that several parking spaces are inaccessible due to the erroneously parked large vehicle 260.

Accordingly, in some implementations, the remote server 110 can refine or increase the accuracy of vacancy rate determination based on additional data representing occupancy state of the parking facility 200. For example, the remote server 110 may be in wireless communication with an aerial image capture device 230, such as an aerial drone device. The remote server 110 can transmit instructions to the aerial image capture device 230 for capturing image data representing an occupancy state of the discrete parking spaces in the parking facility 200 and, subsequently, determine based on the image data that the subject vehicle 250 is occupying the target parking space 252 in addition to a portion of the adjacent parking space 254. In some examples, the remote server 110 can transmit instructions to the aerial image capture device 230 for freely navigating the aerial image capture device 230 throughout the parking facility. In some other examples, the aerial image capture device 230 may be navigated along fixed routes that provide sufficient visual coverage for the parking facility. It can be appreciated that other vehicles may be erroneously parked and the illustrations in FIG. 2 are merely illustrative.

Based on determining that the subject vehicle 250 is occupying a target parking space 252 in addition to an area external to the target parking space 252, the remote server can determine a number of unusable parking spaces, such as the unusable adjacent parking space 254, and generate parking space inventory data based on the determined number of unusable parking spaces.

In some examples, the remote server 110 can determine that a vehicle, such as the large vehicle 260 illustrated in FIG. 2, is occupying a target parking space in addition to a laneway 270 (e.g., area external to the target parking space) and, in response, determine the number of unusable parking spaces that would otherwise be accessible by the laneway 270.

In some scenarios, the vehicle detection sensors may be ill-equipped for identifying non-vehicle obstructions 266, such as a snow pile or construction equipment placed thereon by maintenance teams. The remote server 110 can determine, based on image data from the aerial image capture device 230, that one or more parking spaces are obstructed and update parking space inventory data to exclude the unavailable parking space from a parking space inventory count.

In some implementations, the remote server 110 can determine that a subject vehicle additionally occupies an area external to the target parking space using image processing operations, such as image recognition operations or the like. For example, the remote server 110 can store a reference parking facility plan including one or more boundaries for respective discrete parking spaces. In FIG. 2, example boundaries for the target parking space 252 and the adjacent parking space 254 are illustrated using dotted lines. The remote server 110 can receive image data representing the occupancy state of the parking facility from the aerial image capture device 130, where the image data includes a top view of the parking facility 200 at a particular point in time. The remote server 110 can, in some examples, conduct image processing operations to overlay a position of the subject vehicle 250 on the reference parking facility plan and, in response, determine that the subject vehicle 250 crosses one or more boundaries of for at least one discrete parking space, such as boundaries of the adjacent parking space 254. For example, a vehicle can be parked across two or more parking spaces, such that the vehicle is oriented in a direction that is substantially perpendicular to a direction of a properly parked vehicle. In another example, as described with reference to FIG. 2, the subject vehicle 250 can be substantially parked in the target parking space 252 and additionally partially within the adjacent parking space 254. That is, the subject vehicle 250 may be straddling two or more parking spaces. Other variations of how the subject vehicle 250 can occupy the target parking space and one or more adjacent parking spaces can be contemplated.

In some examples, when the remote server 110 determines that a subject vehicle crosses one or more boundaries for at least one discrete parking space, the remote server 110 can transmit a notification message to the target vehicle or to a communication device associated with the subject vehicle. The notification message can include a request that the vehicle operator take remedial action, such as re-parking the subject vehicle or removing the subject vehicle from the adjacent parking space 254. In some other examples, the remote server 110 can also transmit a notification message to a parking facility management device for identifying the erroneously parked vehicles, thereby allowing parking facility operators to seek remedies for the erroneously parked vehicle or take other actions to extricate the erroneously parked vehicle.

Figure 3:
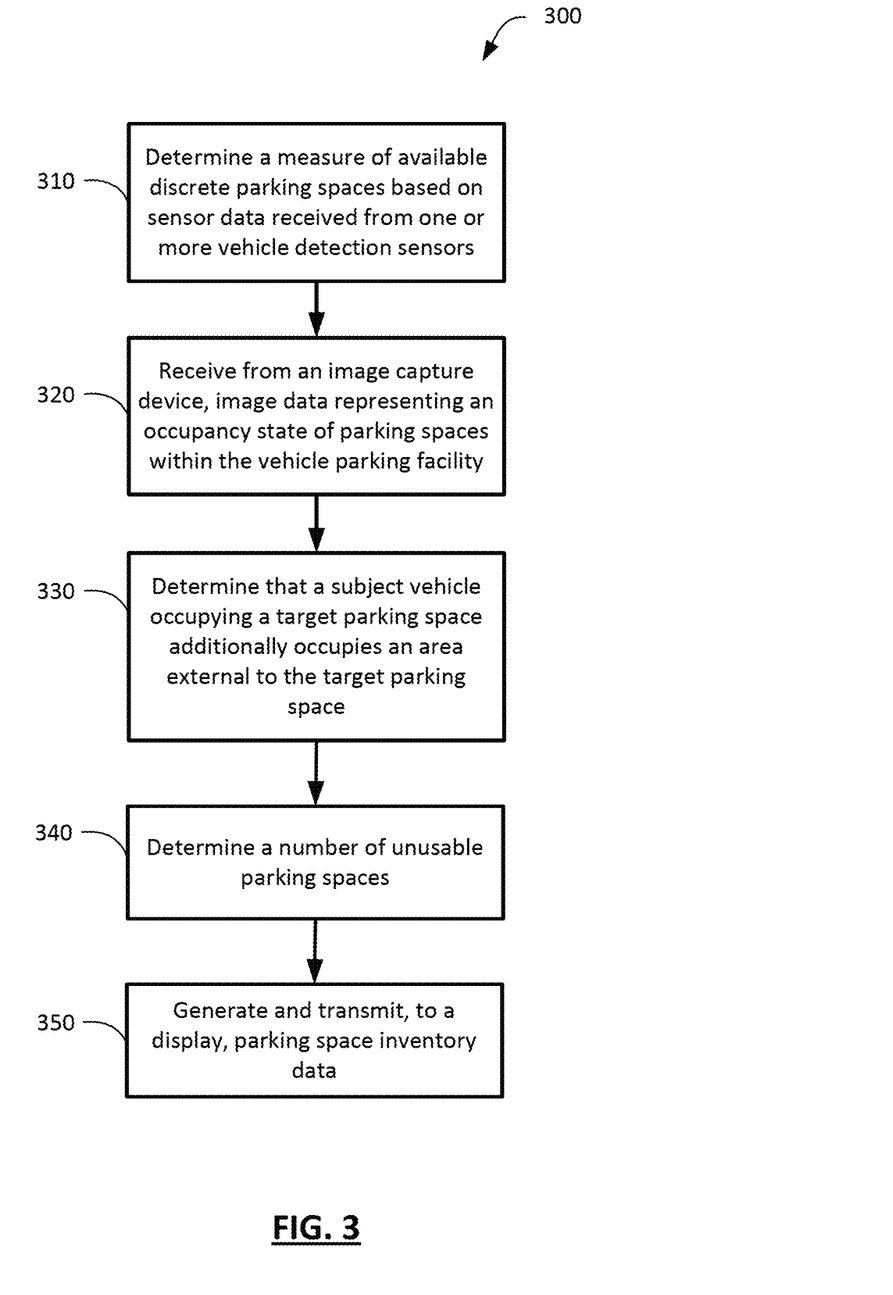
FIG. 3 illustrates, in flowchart form, a method of vehicle detection within a vehicle parking facility, in accordance with an example of the present application.

Reference is now made to FIG. 3, which shows, in flowchart form, a method 300 of vehicle detection within a vehicle parking facility to identify misused parking spaces, in accordance with an example of the present application. The method 300 includes operations that are carried out by one or more processors of the remote server 110. The method 300 may be implemented, at least in part, through processor-executable instructions associated with the parking space management application 114. In some examples, one or more of the operations may be implemented via processor-executable instructions in other applications or in an operating system stored and executed in memory of the remote server 110.

At operation 310, the processor determines a measure of available discrete parking spaces based on sensor data received from one or more vehicle detection sensors. The measure of available parking spaces can be a numerical estimate of vacant parking spaces based on received data. For example, the processor can receive sensor data from overhead detection sensors 222 (FIG. 2) or vehicle detection sensors 120 (FIG. 2) located at an entrance/exit passageway 210 of the parking facility. In some examples, the sensor data can include a numerical count of the number of vehicles detected within the parking facility. It can be appreciated based on the operations described herein that vacancy rates determined based on the sensor data from the one or more vehicle detection sensors can further be refined or adjusted based on determining that one or more vehicles are erroneously parked.

At operation 320, the processor receives, via a communication module from an image capture device, image data representing an occupancy state of discrete parking spaces within the vehicle parking facility. In some examples, the image capture device can be a network of image cameras positioned at known locations throughout the parking facility for collectively providing image data representing the occupancy state of discrete parking spaces. In some other examples, the image capture device can be an aerial drone device that can be navigated to various locations of the parking facility for capturing image data representing the occupancy state of discrete parking spaces within the vehicle parking facility. In some examples, the system 100 can include a plurality of aerial drone devices, where each respective aerial drone device may be assigned to capture image data for a subdivision of the parking facility. In some examples, the remote server 110 can transmit instructions to the aerial drone device for capturing image data to eliminate challenges due to the parallax effect that otherwise may result when using fixed position image capture devices.

At operation 330, the processor determines, based on the image data representing the occupancy state, that a subject vehicle occupying a target parking space additionally occupies an area external to the target parking space. In some examples, determining that the subject vehicle occupies an area external to the target parking space includes determining that the subject vehicle is positioned across two or more discrete parking spaces and, thus, unusable parking spaces include at least one of the two or more parking spaces. That is, in some examples, the subject vehicle can be parked in an orientation that is perpendicular to an intended orientation. In some examples, the subject vehicle can be substantially parked in the target parking space and additionally partially within a parking space adjacent to the target parking space (e.g., the subject vehicle may be straddling two or more parking spaces).

In some examples, the processor can execute image recognition operations for identifying vehicular positions relative to parking spaces or parking space boundaries. In some examples, the processor can compare: (1) a reference parking facility plan including one or more boundaries for respective discrete parking spaces; and (2) the image data representing the occupancy state of the parking facility for determining whether any subject vehicles may be erroneously occupying an area external to a target parking space, thereby rendering the area external to the target parking space unusable. In some examples, one or more image capture devices can capture image data representing an occupancy state of sub-portions of the parking facility and, subsequently, the processor can stitch or merge the image data representing the occupancy state of the sub-portions to provide a panoramic-type image of the parking facility. By stitching together or merging image data representing sub-portions of the parking facility, the image data can capture higher resolution images of the parking facility. In some examples, the processor can execute image recognition operations for identifying vehicle collision, vehicles that may have broken down and are obstructing portions/entranceway/exit ways of the parking facility, or other similar type action.

In response to determining that a subject vehicle occupying a target space additionally occupies an area external to the target parking space, the processor at operation 340 determines a number of unusable parking spaces. For example, referring again to the examples illustrated in FIG. 2, the processor can determine that the adjacent parking space 254 is unavailable for use by another passenger vehicle due at least in part to the partial occupation by the subject vehicle 250.

In another example, the processor can determine that several parking spaces that are normally accessible by the laneway 270 are unavailable for use by other vehicles due at least in part to the erroneous occupation by the large vehicle 260 of the laneway 270. For instance, the processor can determine, based on the image data representing the occupancy state, that the area external to the target parking space that is occupied by the large vehicle 260 (FIG. 2) is a portion of a laneway 270. In response, the processor can determine a number of discrete parking spaces that are inaccessible due to the obstructed laneway. Referring again to FIG. 2, the processor can determine that at least 8 currently unoccupied parking spaces are inaccessible due to obstruction to the laneway 270 by the large vehicle 260. Thus, in the present example, the processor can update and transmit, to the display 160, adjusted parking space inventory data based on the number of currently unoccupied but inaccessible parking spaces.

At operation 350, the processor generates and transmits, to a display, parking space inventory data based on the measure of available discrete parking spaces and the determined number of unusable parking spaces. In some examples, the display can be positioned at an entrance/exit passage way of the parking facility or can be a display positioned at laneways leading to subdivisions of the parking facility.

As described above, in some scenarios, a non-vehicle obstruction may occupy an otherwise available parking space. Thus, in some examples, the processor can determine, based on the image data representing the occupancy state, that a non-vehicle obstruction occupies an available discrete parking space. In response, the processor can identify that the available discrete parking space that is obstructed by the non-vehicle obstruction is currently an unavailable parking space. Subsequently, the processor can update the parking space inventory data to exclude the unavailable parking space from the parking space inventory count. In some examples, the processor can generate a parking space map for illustrating the parking space inventor data, including marked up portions of the map for illustrating available parking spaces and for illustrating areas that are designated as unavailable or designated as "no parking" zones. In some examples, the parking space map can visually indicate occupied parking spaces, available parking spaces, parking spaces that are blocked or inaccessible, or the types of vehicles that may be permitted or allocated for particular parking spaces. The generated parking space map can be displayed in a mobile device application or a computing device associated with a parking facility manager.

The example operations described herein can refine parking facility vacancy rate information based on determining that one or more vehicles are erroneously parked. The aerial drone device can capture image data at a plurality of vantage point locations throughout the parking facility, including at low altitudes within low-ceiling parking structures or at high altitudes providing a "bird's eye" top view of an outdoor parking facility. In some examples, upon refining the parking facility vacancy rate information to more accurately represent the availability of parking spaces in the parking facility, it may be desirable to remedy the effect of erroneously parked vehicles. Example operations for remedying the effect of erroneously parked vehicles are described with reference to FIG. 4.

Figure 4:
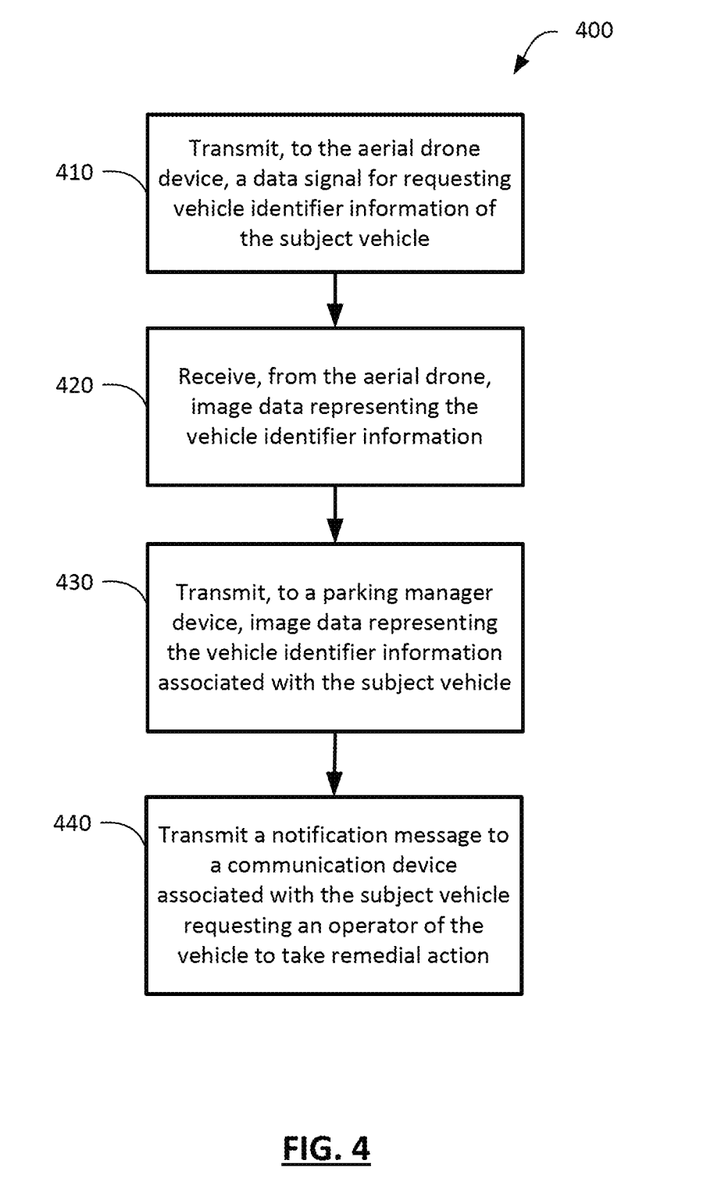
FIG. 4 illustrates, in flowchart form, a method of vehicle detection within a vehicle parking facility, in accordance with another example of the present application.

FIG. 4 illustrates, in flowchart form, a method 400 of vehicle detection within a vehicle parking facility, in accordance with another example of the present application. The method 400 includes operations that may be carried out by one or more processors of the remote server 110. The method 400 may be implemented, at least in part, through processor-executable instructions associated with the parking space management application 114. In some examples, one or more of the operations may be implemented via processor-executable instructions in other applications or in an operating system stored and executed in memory of the remote server 110.

At operation 410, the processor transmits, to an aerial drone device, a data signal for requesting vehicle identifier information for the subject vehicle. For example, the remote server may identify location or position information of the erroneously parked vehicle relative to reference points of the parking facility and transmit a data signal for requesting vehicle identifier information of the erroneously parked subject vehicle. In some examples, the data signal can include instructions for navigating the aerial drone device to a location proximal to the subject vehicle to capture image data representing the vehicle identifier information. For instance, the data signal may indicate that the subject vehicle is located on parking level 3, parking space 78. The aerial drone device may receive the data signal and navigate to a position proximal to the identified parking space for capturing an image of the license plate or other identifying information associated with the subject vehicle. It may be desirable to navigate the aerial drone device to a position proximal to a subject vehicle because the previously captured image data representing an occupancy state of the parking spaces may not include sufficient image data for providing vehicle identification information.

At operation 420, the processor receives, from the aerial drone device, image data representing the vehicle identifier information for display on a parking manager device. The vehicle identifier information, such as a license plate number, can be used for identifying the vehicle or for initiating remedial action request. For example, remedial action can include levying a fine to the vehicle operator of the subject vehicle, or extricating or towing the vehicle from the parking facility. In some examples, the processor can generate and transmit a message to the vehicle owner informing the vehicle owner of the erroneously parked vehicle. In some examples, the processor can retrieve the vehicle owner (or driver) information via a transportation registry system managing licensed vehicles or drivers in a geographic region. In some examples, the vehicle driver information can be based on information (e.g., contact information, etc.) provided by the vehicle driver upon entering the parking facility.

In some examples, at operation 430, the processor can transmit, to a parking manager device, image data representing the vehicle identifier information associated with the subject vehicle. A user of the parking manager device can be notified of potential events that minimize capacity of the parking facility.

In some examples, at operation 440, the processor can transmit a notification message to a communication device associated with the subject vehicle requesting an operator of the subject vehicle take remedial action. The request for remedial action can include a request to remedy the parking deficiencies within a period of time or a request to pay further fees for occupying more space than the allocated parking space.

In some implementations, based on refining vacancy rate information for the parking facility and identifying unusable parking spaces due to erroneously parked vehicles, the remote server can conduct operations for displaying, in real time or near real time, navigation directions on one or more displays (e.g., display 160 positioned within the parking facility). The one or more displays can be configured to direct circling vehicles to portions of the parking facility where available parking spaces may not be obstructed. In some implementations, the remote server can dynamically display navigation directions on the one or more displays based on image data that may be periodically received from an aerial image capture device. For example, the navigation directions may be displayed in real time or near real time in response to changing vacancy rates deduced from image data of the aerial image capture device.

As described herein, aerial drone devices can capture image data at a plurality of desired locations throughout the parking facility. Thus, the remote server can utilize aerial drone devices and data captured thereon for parking facility management operations. For instance, the remote server can conduct operations for registering vehicles to particular parking spaces. In some examples, the remote server can transmit, to the aerial drone device, a data signal with instructions for periodically canvassing the vehicle parking facility for collecting vehicle identifier information. Subsequently, the remote server can identify, from image data received from the aerial drone device, vehicle identifier information of respective vehicles within the vehicle parking facility and register the respective identified vehicle identifier information with a discrete parking space. That is, image data representing the occupancy state of the parking facility can be used for facilitating a vehicle check-in procedure at the parking facility.

Figure 5:
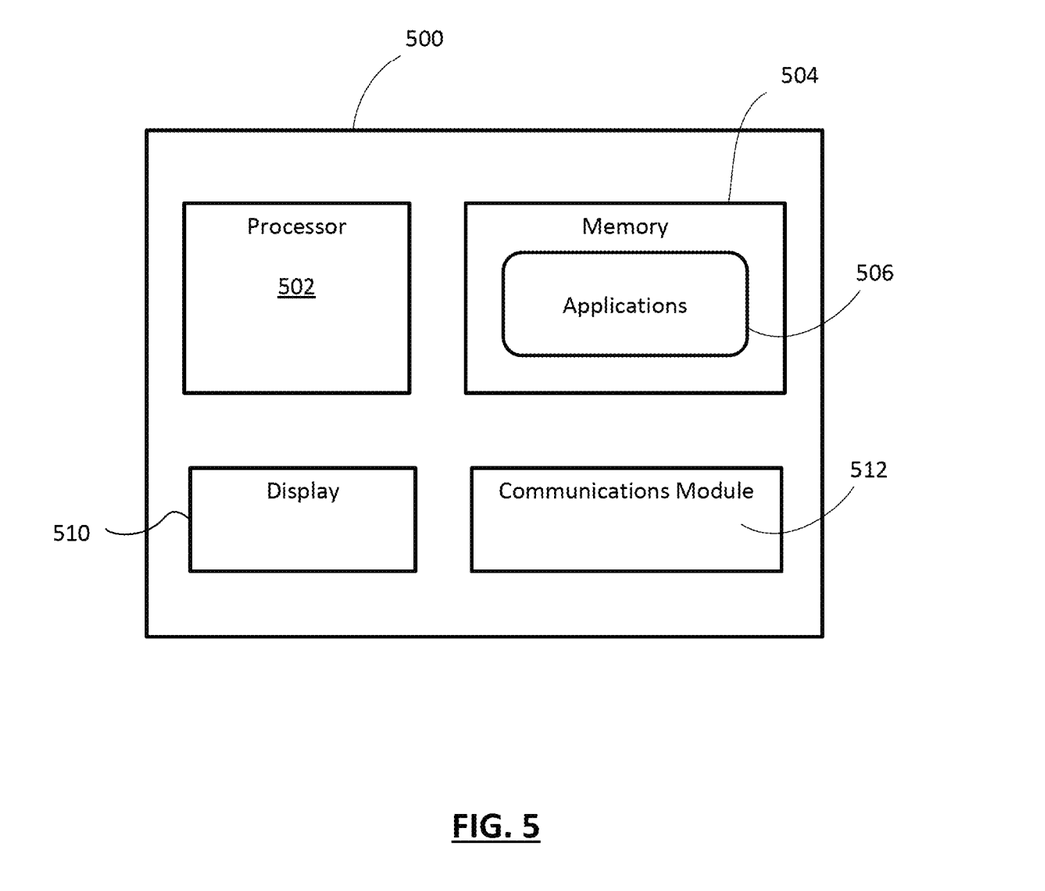
FIG. 5 illustrates a simplified block diagram of a computing device, in accordance with an example of the present application.

Reference is now made to FIG. 5, which illustrates a simplified block diagram of a remote server 500 or a communication device, in accordance with an example of the present application. The remote server 500 includes one or more processors 502 and memory 504. The memory 504 stores processor-executable software or applications 506, such as a parking space management application containing instructions implementing the operations or functions of the systems described herein. The memory 504 may also store data, such as parking inventory data, or other types of data as described herein.

The remote server 500 also includes a communications module 512 for transmitting and receiving data to and from other devices described herein. In some examples, the remote server 500 includes a display 510 or display interface for providing visual output to a user of the remote server 500.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A system for vehicle detection within a vehicle parking facility, the system including one or more infrared vehicle detection sensors positioned about the vehicle parking facility, each infrared sensor positioned atop a respective parking space and centrally located within the boundaries of the respective parking space, the system comprising:
a server including:
a communication module;
a processor coupled to the communication module; and
a memory coupled to the processor, the memory storing processor-executable instructions that, when executed, cause the processor to:
determine a measure of available parking spaces based on sensor data received from the one or more infrared vehicle detection sensors, the sensor data including a numerical count of a number of vehicles detected within the vehicle parking facility;
send, via the communication module and to a mobile image capture device, data signals instructing the mobile image capture device to navigate to positions within the vehicle parking facility along one or more fixed routes and capture image data representing an occupancy state of discrete parking spaces within the vehicle parking facility;
receive, via the communication module from the mobile image capture device, the image data representing the occupancy state of discrete parking spaces within the vehicle parking facility;
determine, based on the image data representing the occupancy state, that a subject vehicle occupying a target parking space additionally occupies an area external to the target parking space and, in response, determine a number of unusable parking spaces; and
generate and transmit, to a display, parking space inventory data based on the determined number of unusable parking spaces and the measure of available parking spaces.

2. The system of claim 1, wherein determining that the subject vehicle occupies an area external to the target parking space includes determining that the subject vehicle is positioned across two or more discrete parking spaces, and wherein the unusable parking spaces include at least one discrete parking space.

3. The system of claim 1, wherein the instructions, when executed, further cause the processor to:
determine, based on the image data representing the occupancy state, that a non-vehicle obstruction occupies an available parking space and, in response, identify that the available parking space that is obstructed by the non-vehicle obstruction is presently an unavailable parking space; and
update the parking space inventory data to exclude the unavailable parking space from an inventory count.

4. The system of claim 1, wherein the instructions, when executed, further cause the processor to:

determine, based on the image data representing the occupancy state, that the area external to the target parking space that is occupied by the subject vehicle is a portion of a laneway adjacent the target parking space;

determine a number of discrete parking spaces that are inaccessible due to the obstructed laneway; and update and transmit, to a display, the parking space inventory data based on the determined number of inaccessible parking spaces.

5. The system of claim 1, wherein the mobile image capture device is an aerial drone device, and wherein the instructions, when executed, further cause the processor to:

transmit, to the aerial drone device, a data signal for requesting vehicle identifier information of the subject vehicle; and receive, from the aerial drone device, image data representing the vehicle identifier information for display on a parking manager device.

6. The system of claim 5, wherein the data signal for requesting vehicle identifier information of the subject vehicle includes instructions for navigating the aerial drone device to a location proximal to the subject vehicle to capture image data representing the vehicle identifier information.

7. The system of claim 1, wherein the memory stores a reference parking facility plan including one or more boundaries for respective discrete parking spaces, and wherein the image data representing the occupancy state includes a top view of the vehicle parking facility, and wherein determining that the subject vehicle additionally occupies an area external to the target parking space includes:

overlaying a position of the subject vehicle on the reference parking facility plan; and determining that the subject vehicle crosses one or more boundaries for at least one discrete parking space.

8. The system of claim 1, wherein the instructions, when executed, further cause the processor to transmit a notification message to a communication device associated with the subject vehicle, wherein the notification message includes a request to an operator of the subject vehicle to take remedial action.

9. The system of claim 1, wherein the mobile image capture device is an aerial drone device, and wherein the instructions, when executed, further cause the processor to:

transmit, to the aerial drone device, a data signal with instructions for periodically canvassing the vehicle parking facility for collecting vehicle identifier information;

identify, from image data received from the aerial drone device, vehicle identifier information of respective vehicles within the vehicle parking facility; and register the respective identified vehicle identifier information with a discrete parking space being occupied by a vehicle associated with the identified vehicle identifier information.

10. A method of operating a system for vehicle detection within a vehicle parking facility, the system including one or more infrared vehicle detection sensors positioned at the vehicle parking facility, each infrared sensor positioned atop a respective parking space and centrally located within the boundaries of the respective parking space, the method comprising:

determining a measure of available parking spaces based on sensor data received from the one or more infrared vehicle detection sensors, the sensor data including a numerical count of a number of vehicles detected within the vehicle parking facility;

sending, via a communication module to a mobile image capture device, data signals instructing the mobile image capture device to navigate to positions within the vehicle parking facility along one or more fixed routes and capture image data representing an occupancy state of discrete parking spaces within the vehicle parking facility;

receiving, via the communication module from the mobile image capture device, the image data representing the occupancy state of discrete parking spaces within the vehicle parking facility;

determining, based on the image data representing the occupancy state, that a subject vehicle occupying a target parking space additionally occupies an area external to the target parking space and, in response, determining a number of unusable parking spaces; and generating and transmitting, to a display, parking space inventory data based on the measure of available parking spaces and the determined number of unusable parking spaces.

11. The method of claim 10, wherein determining that the subject vehicle occupies an area external to the target parking space includes determining that the subject vehicle is positioned across two or more discrete parking spaces, and wherein the unusable parking spaces include at least one discrete parking space.

12. The method of claim 10, further comprising:

determining, based on the image data representing the occupancy state, that a non-vehicle obstruction occupies an available parking space and, in response, identifying that the available parking space that is obstructed by the non-vehicle obstruction is presently an unavailable parking space; and updating the parking space inventory data to exclude the unavailable parking space from an inventory count.

13. The method of claim 10, further comprising:

determining, based on the image data representing the occupancy state, that the area external to the target parking space that is occupied by the subject vehicle is a portion of a laneway adjacent the target parking space;

determining a number of discrete parking spaces that are inaccessible due to the obstructed laneway; and updating and transmitting, to a display, the parking space inventory data based on the determined number of inaccessible parking spaces.

14. The method of claim 10, wherein the mobile image capture device is an aerial drone device, and wherein the method further comprising:

transmitting, to the aerial drone device, a data signal for requesting vehicle identifier information of the subject vehicle; and receiving, from the aerial drone device, image data representing the vehicle identifier information for display on a parking manager device.

15. The method of claim 14, wherein the data signal for requesting vehicle identifier information of the subject vehicle includes instructions for navigating the aerial drone device to a location proximal to the subject vehicle to capture image data representing the vehicle identifier information.

16. The method of claim 10, wherein the memory stores a reference parking facility plan including one or more boundaries for respective discrete parking spaces, and wherein the image data representing the occupancy state includes a top view of the vehicle parking facility, and wherein determining that the subject vehicle additionally occupies an area external to the target parking space includes:

overlaying a position of the subject vehicle on the reference parking facility plan; and determining that the subject vehicle crosses one or more boundaries for at least one discrete parking space.

17. The method of claim 10, further comprising transmitting a notification message to a communication device associated with the subject vehicle, wherein the notification message includes a request to an operator of the subject vehicle to take remedial action.

18. The method of claim 10, wherein the mobile image capture device is an aerial drone device, and the method further comprising:

transmitting, to the aerial drone device, a data signal with instructions for periodically canvassing the vehicle parking facility for collecting vehicle identifier information;

identifying, from image data received from the aerial drone device, vehicle identifier information of respective vehicles within the vehicle parking facility; and registering the respective identified vehicle identifier information with a discrete parking space being occupied by a vehicle associated with the identified vehicle identifier information.

19. A non-transitory computer-readable medium storing processor readable instructions for operating a system for vehicle detection within a vehicle parking facility, the system including one or more infrared vehicle detection sensors positioned at the vehicle parking facility, each infrared sensor positioned asop a respective parking space and centrally lcoated within the boundaries of the respective parking space, wherein the instructions, when executed by a processor of a remote server in the system, cause the remote server to:

determine a measure of available parking spaces based on sensor data received from the one or more infrared vehicle detection sensors, the sensor data including a numerical count of a number of vehicles detected within the vehicle parking facility;

send, via the communication module and to a mobile image capture device, data signals instructing the mobile image capture device to navigate to positions within the vehicle parking facility along one or more fixed routes and capture image data representing an occupancy state of discrete parking spaces within the vehicle parking facility;

receive, via the communication module from the mobile image capture device, the image data representing the occupancy state of discrete parking spaces within the vehicle parking facility;

determine, based on the image data representing the occupancy state, that a subject vehicle occupying a target parking space additionally occupies an area external to the target parking space and, in response, determine a number of unusable parking spaces; and generate and transmit, to a display, parking space inventory data based on the determined number of unusable parking spaces and the measure of available parking spaces.

20. The non-transitory computer-readable medium of claim 19, wherein the instructions, when executed by the processor of the remote server in the system, further cause the remote server to:

determine, based on the image data representing the occupancy state, that the area external to the target parking space that is occupied by the subject vehicle is a portion of a laneway adjacent the target parking space;

determine a number of discrete parking spaces that are inaccessible due to the obstructed laneway; and update and transmit, to a display, the parking space inventory data based on the determined number of inaccessible parking spaces.

* * * * *